US006530219B1

(12) United States Patent
Yeh

(10) Patent No.: US 6,530,219 B1
(45) Date of Patent: Mar. 11, 2003

(54) JACK ASSEMBLY THAT MAY BE LIFTED RAPIDLY

(76) Inventor: Kuo-Chung Yeh, 43-2, Wa Tsuo, Kuo Kou Community, Tai Bao City, Jia Yi Chien (TW)

(*) Notice: Subject to any disclaimer, the term of this patent is extended or adjusted under 35 U.S.C. 154(b) by 0 days.

(21) Appl. No.: 10/012,718

(22) Filed: Nov. 5, 2001

(51) Int. Cl.[7] .......... F16D 31/02
(52) U.S. Cl. .......... 60/477
(58) Field of Search .......... 60/477, 479

(56) References Cited

U.S. PATENT DOCUMENTS 3,581,499 A * 6/1971 Barosko .......... 60/477
3,782,689 A * 1/1974 Barosko .......... 60/477
4,567,911 A * 2/1986 Kedem .......... 60/425
5,755,099 A * 5/1998 Hung .......... 60/479
6,035,635 A * 3/2000 Hung .......... 60/479

* cited by examiner

*Primary Examiner*—Edward K. Look
*Assistant Examiner*—Thomas E. Lazo
(74) *Attorney, Agent, or Firm*—Alan Kamrath; Rider, Bennett, Egan & Arundel, LLP

(57) ABSTRACT

The present invention relates a jack assembly that may be lifted rapidly. A secondary shaft is mounted in a lifting column, and has a distal end screwed into an axial hole in the base. The main oil path is provided with a lower ball and an upper ball, and has a first oil hole connected to the oil hole of the secondary shaft, and a second oil hole connected to the inner oil chamber. The hydraulic oil pushes away the lower ball to flow through the first oil hole into the secondary shaft, so that the lifting column that has not worked may be lifted rapidly. The lifting column may work to increase the pressure of the hydraulic oil which flows through the second oil hole into the inner oil chamber, so that the lifting column may have a sufficient lifting force to lift an object.

7 Claims, 8 Drawing Sheets

JACK ASSEMBLY THAT MAY BE LIFTED RAPIDLY

BACKGROUND OF THE INVENTION

1. Field of the Invention

The present invention relates to a jack assembly, and more particularly to a jack assembly that may be lifted rapidly.

2. Description of the Related Art

A conventional jack in accordance with the prior art shown in FIGS. 1–4 comprises a base 10, a push seat 14, and an outer cylinder 11 and an inner cylinder 12 mounted between the base 10 and the push seat 14. An inner oil chamber is formed in the inner cylinder 12, and an oil storage chamber "A" filled with hydraulic oil is formed between the outer cylinder 11 and the inner cylinder 12. A lifting column 13 is mounted in the inner oil chamber of the inner cylinder 12, and has a first end provided with a piston 131, and a second end that may be protruded outward to perform a lifting action.

The base 10 is provided with a main oil path 102, and has an end face provided with an oil suction hole 101 connected to the lower end of the main oil path 102. An anti-reverse ball 31 is mounted in the lower end of the main oil path 102 to block the main oil path 102, and is pushed by a post 32. A main ball 33 is mounted in the mediate portion of the main oil path 102, and is pushed by an adjusting screw 34. An oil inlet hole 106 located above the main ball 33 is formed in the inner wall of the main oil path 102, and is connected to the inner oil chamber as shown in FIG. 3.

An oil hole 103 located above the anti-reverse ball 31 is formed in the inner wall of the main oil path 102, and is connected to a return oil path 104 as shown in FIG. 4. A spring 42 is mounted in the return oil path 104, and is pushed by a screw 41. A pusher 43 is mounted on the lower end of the spring 42, and has a distal end provided with a ball 44 which is placed in an oil hole that is connected to the oil hole 103. The inner wall of the return oil path 104 is formed with a return oil hole 105 that is connected to the oil storage chamber "A".

Thus, when the pump 2 mounted on the base 10 perform a suction action through the oil hole 103, the hydraulic oil contained in the oil storage chamber "A" is sucked into the lower end of the main oil path 102 through the oil suction hole 101, to push away the anti-reverse ball 31, so that the hydraulic oil may be sucked into the oil hole 103 and the pump 2. Then, when the pump 2 is pushed and compressed, the hydraulic oil may be pushed into the main oil path 102 without returning to the oil storage chamber "A" by stopping of the anti-reverse ball 31. The hydraulic oil then pushes the main ball 33 upward, so that the hydraulic oil may flow through the oil inlet hole 106 into the inner chamber. The pump 2 may be operated continuously, so that the hydraulic oil may be pushed into the inner chamber successively, to force the lifting column 13 in the inner oil chamber of the inner cylinder 12 to move outward so as to perform a lifting action.

However, the amount of the hydraulic oil that is pushed into the inner chamber at each time is very small, and the inner chamber has a large cross-sectional area, so that the lifting velocity of the lifting column 13 is very slow, thereby consuming working time, and thereby causing inconvenience to the user.

SUMMARY OF THE INVENTION

The present invention has arisen to mitigate and/or obviate the disadvantage of the conventional jack.

The primary objective of the present invention is to provide a jack assembly that may be lifted rapidly. A lifting column is mounted in the inner cylinder. A secondary shaft formed with an oil hole is mounted in the lifting column, and has a distal end screwed into an axial hole in the base. The main oil path is provided with a lower ball, and an upper ball, the main oil path is formed with a first oil hole located above the lower ball and connected to the oil hole of the secondary shaft, and formed with a second oil hole located above the upper ball and connected to the inner oil chamber. The hydraulic oil pushes away the lower ball, so that the hydraulic oil may flow through the first oil hole into the oil hole of the secondary shaft, so that the lifting column that has not worked may be lifted rapidly. The lifting column works to increase the pressure of the hydraulic oil of the main oil path, so that the hydraulic oil flows through the second oil hole into the inner oil chamber of the inner cylinder, so that the lifting column may have a sufficient lifting force to lift an object.

In accordance with the present invention, there is provided a jack assembly that may be lifted rapidly, comprising: a base, a push seat, and an outer cylinder and an inner cylinder mounted between the base and the push seat, an inner oil chamber formed in the inner cylinder, an oil storage chamber formed between the outer cylinder and the inner cylinder, a lifting column mounted in the inner cylinder, and having a distal end provided with a piston, the base provided with a main oil path, and having an end face provided with an oil suction hole connected to the oil storage chamber and connected to a lower end of the main oil path, an anti-reverse ball mounted in the lower end of the main oil path to block the main oil path, and is pushed by a post, an oil hole located above the anti-reverse ball being formed in the inner wall of the main oil path, and connected to a return oil path; wherein:

a lower ball is mounted in a mediate portion of the main oil path, and is pushed by a first spring, an upper end of the first spring is provided with an upper ball, the upper ball is provided with a push post which is pushed by a second spring, an upper end of the second spring is pushed by an adjusting screw, the main oil path has an inner wall formed with a first oil hole that is located above the lower ball, the first oil hole is connected to an oil hole of a center of a secondary shaft that is mounted in the lifting column, the inner wall of the main oil path is formed with a second oil hole that is located above the upper ball, and is connected to the inner oil chamber; and wherein:

hydraulic oil in the oil storage chamber pushes away the lower ball, so that the hydraulic oil may flow through the first oil hole into the oil hole of the secondary shaft, the hydraulic oil may push the lifting column by means of a smaller cross-sectional area of an axial hole for receiving the secondary shaft, so that the lifting column that has not worked may be lifted rapidly, thereby shortening the working stroke, when lifting of the lifting column is stopped, the lifting column works and a pressure of the hydraulic oil of the main oil path is increased largely, whereby the upper ball is pushed away, so that the hydraulic oil flows through the second oil hole into the inner oil chamber of the inner cylinder, the inner oil chamber of the inner cylinder has a larger cross-sectional area, so that the lifting column may have a sufficient lifting force to lift an object.

The base has another end face provided with an anti-reverse valve, so that the hydraulic oil in the oil storage chamber may be introduced into the inner oil chamber of the inner cylinder, and hydraulic oil in the inner oil chamber of the inner cylinder cannot flow into the oil storage chamber.

The anti-reverse valve includes a screw seat, a ball, and a spring.

The anti-reverse valve has an oil hole formed in the end face of the base, the oil hole has a first end connected to a conducting pipe that is connected to the oil storage chamber, and a second end connected to the inner oil chamber of the inner cylinder.

Thus, during a non-work stroke of the lifting column, a suction action applied on the inner oil chamber of the inner cylinder forces hydraulic oil to flow through the conducting pipe, the anti-reverse valve and the oil hole to enter the inner oil chamber of the inner cylinder, so that the lifting column may be conveniently lifted rapidly.

Further benefits and advantages of the present invention will become apparent after a careful reading of the detailed description with appropriate reference to the accompanying drawings.

DETAILED DESCRIPTION OF THE INVENTION

Figure 1:
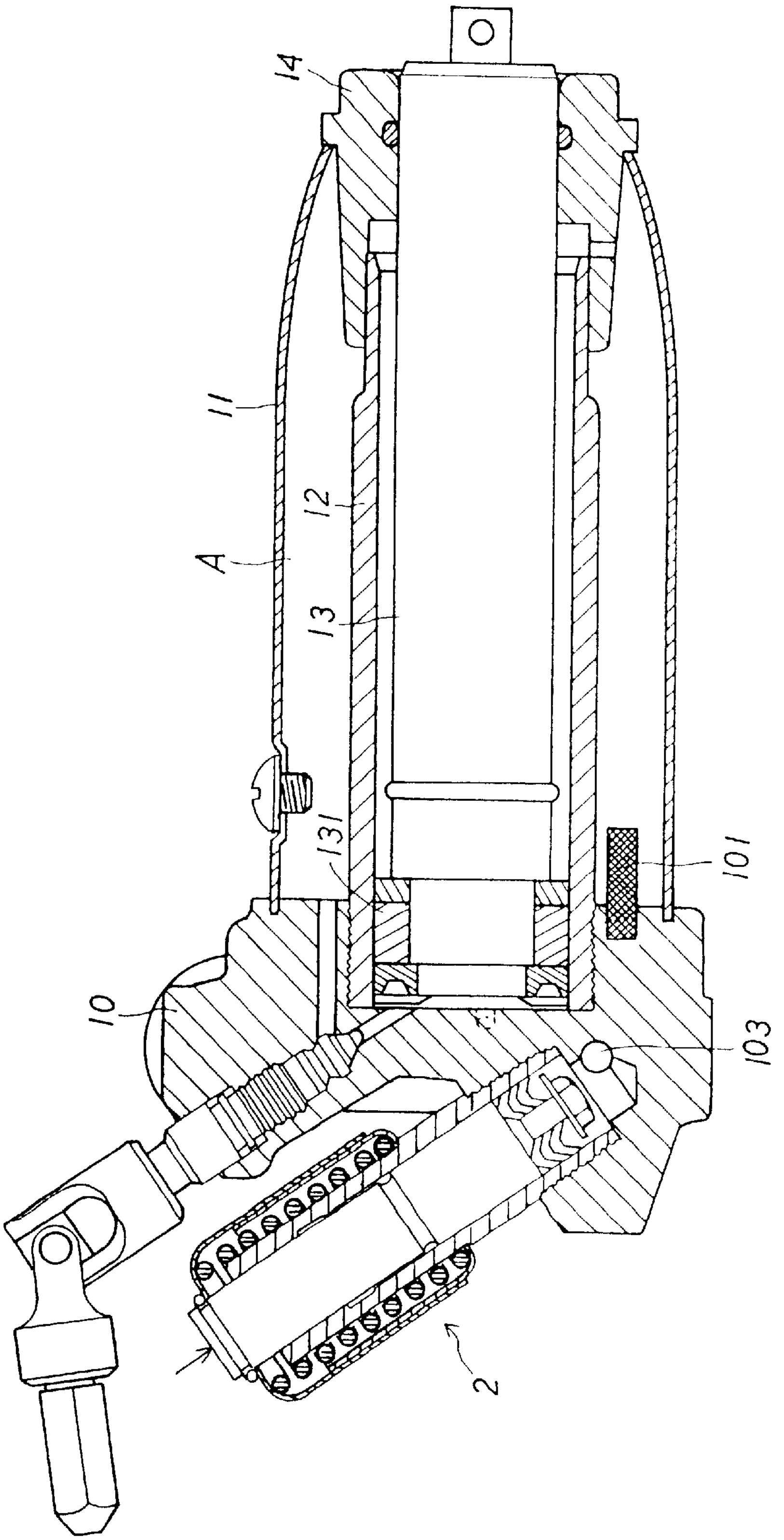
FIG. 1 PRIOR ART
FIG. 1 is a plan cross-sectional assembly view of a conventional jack in accordance with the prior art.
Figure 2:
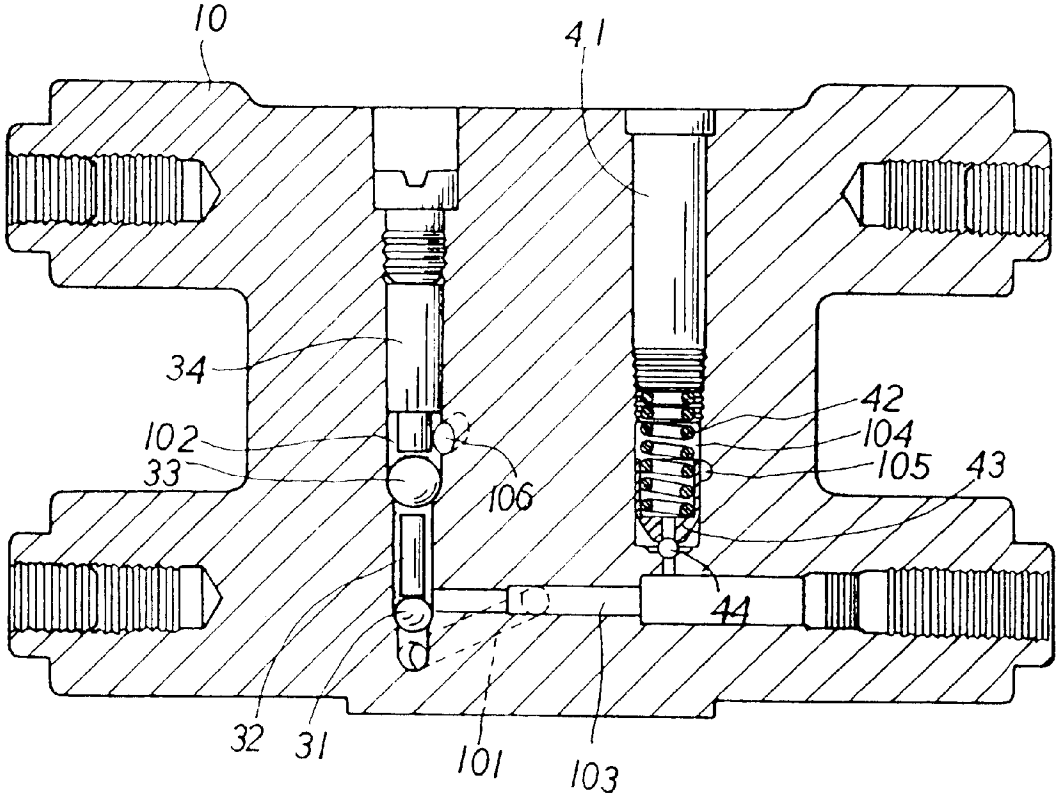
FIG. 2 PRIOR ART
FIG. 2 is a plan cross-sectional view of the base of the conventional jack in accordance with the prior art.
Figure 3:
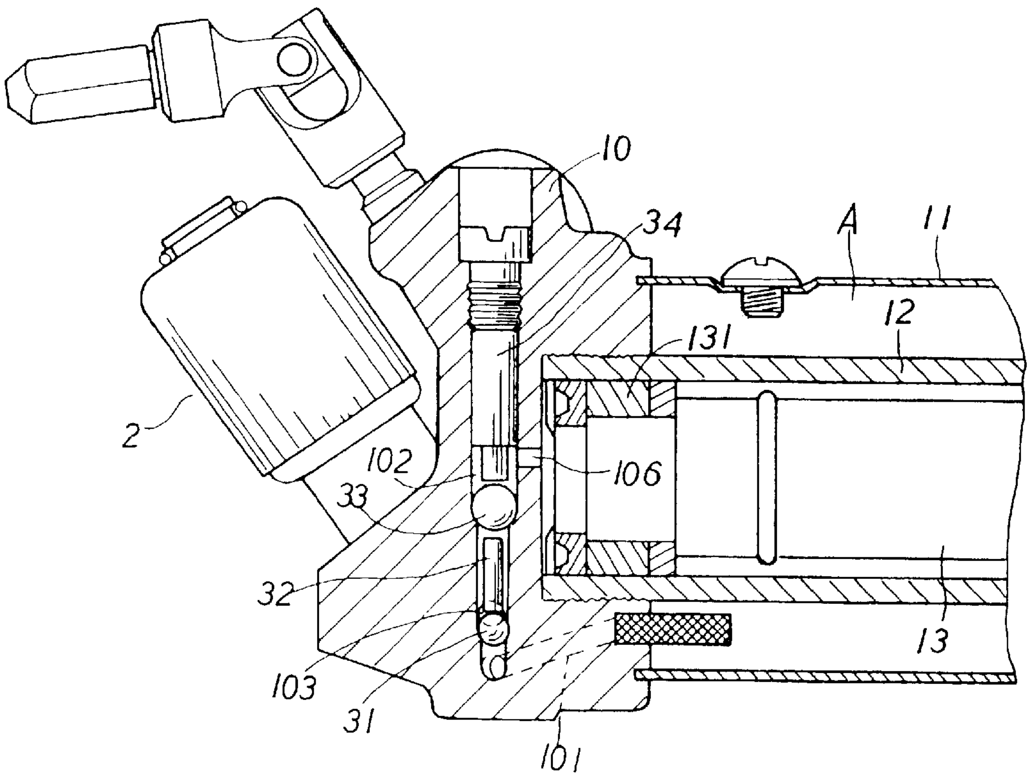
F I G. 3 PRIOR ART
FIG. 3 is a partially cut-away cross-sectional assembly view of the conventional jack in accordance with the prior art.
Figure 4:
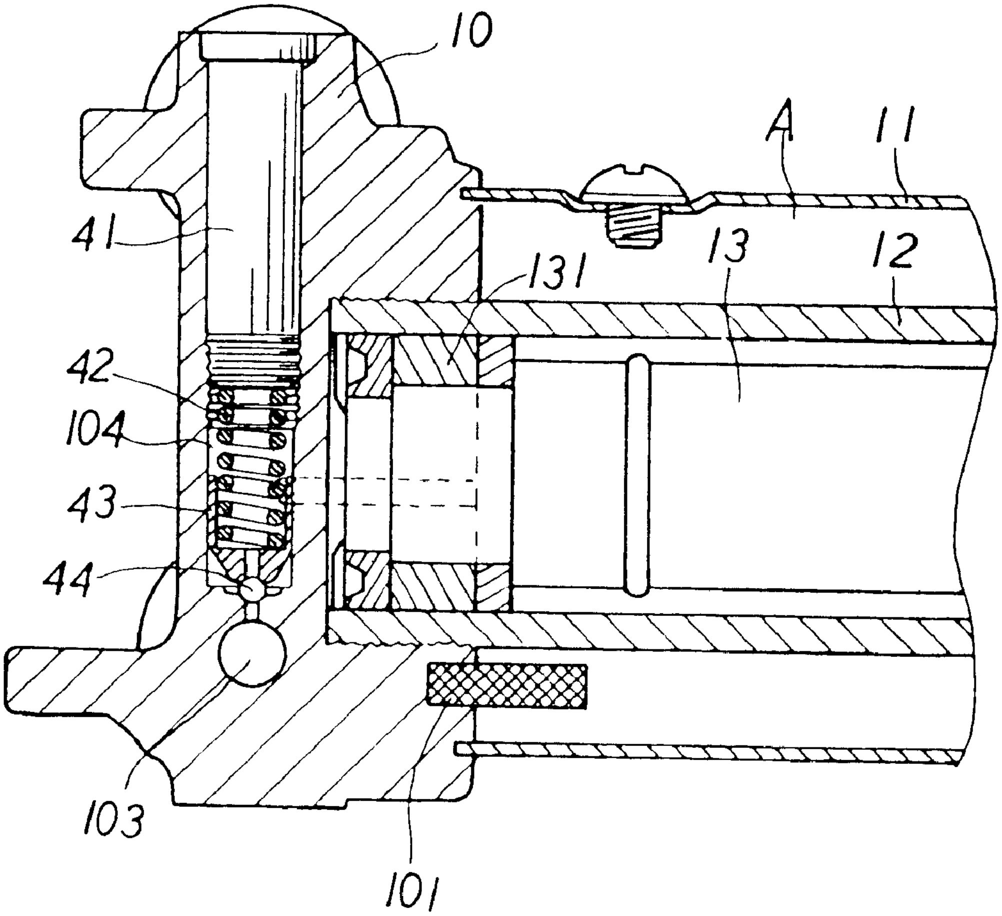
FIG. 4 PRIOR ART
FIG. 4 is a partially cut-away cross-sectional assembly view of the conventional jack in accordance with the prior art.
Figure 5:
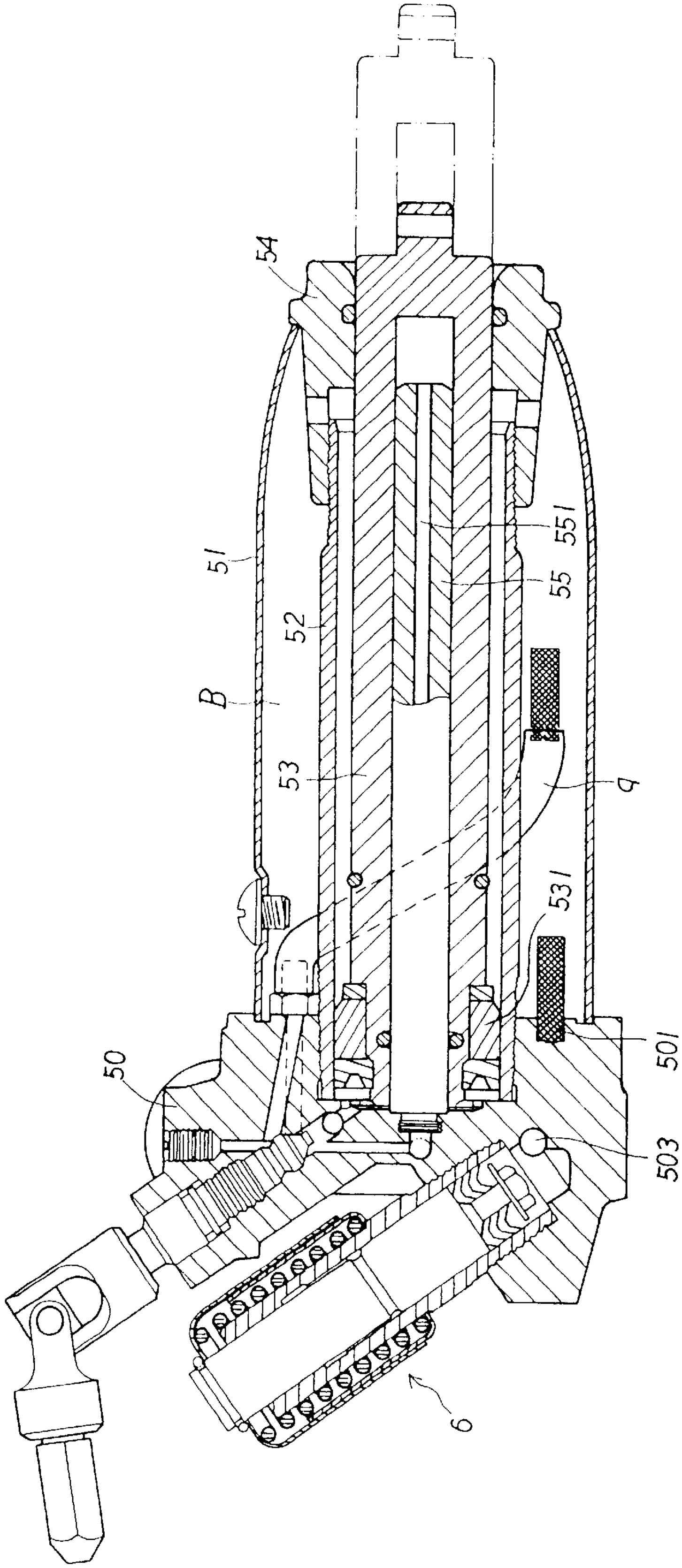
FIG. 5 is a plan cross-sectional assembly view of a jack assembly that may be lifted rapidly in accordance with the preferred embodiment of the present invention.
Figure 7:
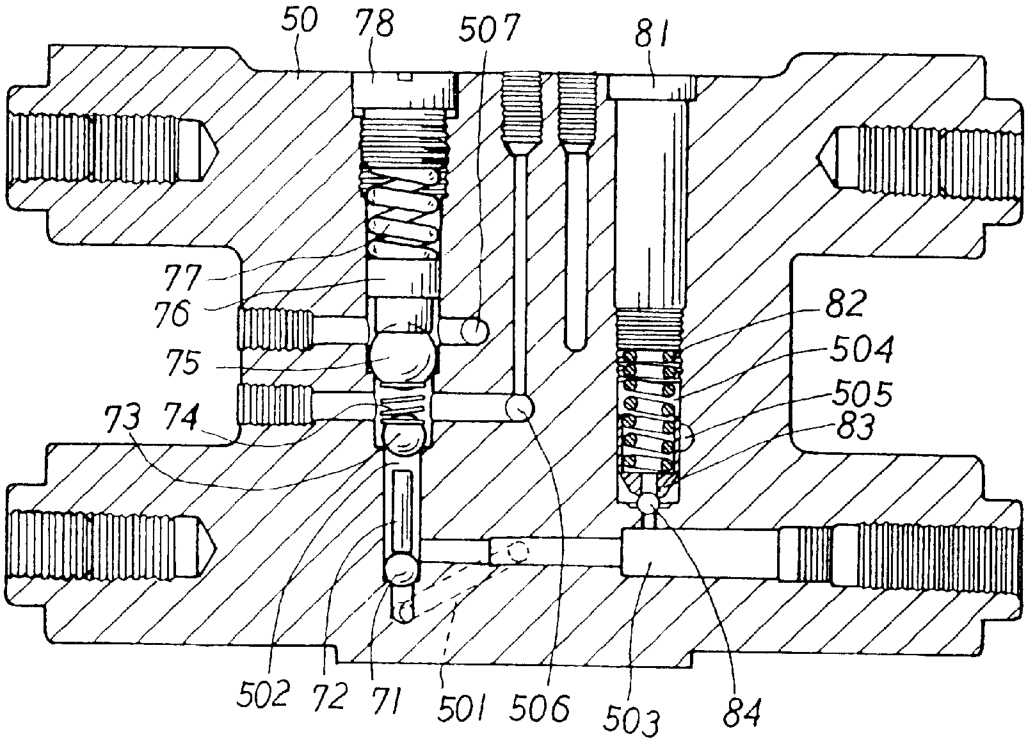
FIG. 7 is a cross-sectional view of the base of the jack assembly that may be lifted rapidly in accordance with the preferred embodiment of the present invention.

Referring initially to FIGS. 5 and 7, a jack assembly that may be lifted rapidly in accordance with a preferred embodiment of the present invention comprises a base 50, a push seat 54, and an outer cylinder 51 and an inner cylinder 52 mounted between the base 50 and the push seat 54. An inner oil chamber is formed in the inner cylinder 52, and an oil storage chamber "B" filled with hydraulic oil is formed between the outer cylinder 51 and the inner cylinder 52. A lifting column 53 is mounted in the inner oil chamber of the inner cylinder 52, and has a first end provided with a piston 531, and a second end that may be protruded outward to perform a lifting action.

The base 50 is provided with a main oil path 502, and has an end face provided with an oil suction hole 501 connected to the oil storage chamber "B" and connected to the lower end of the main oil path 502. An anti-reverse ball 71 is mounted in the lower end of the main oil path 502 to block the main oil path 502, and is pushed by a post 72.

A lower ball 73 is mounted in a mediate portion of the main oil path 502, and is pushed by a spring 74. The upper end of the spring 74 is provided with an upper ball 75. The upper ball 75 is provided with a push post 76 which is pushed by a spring 77. The upper end of the spring 77 is pushed by an adjusting screw 78.

Figure 8:
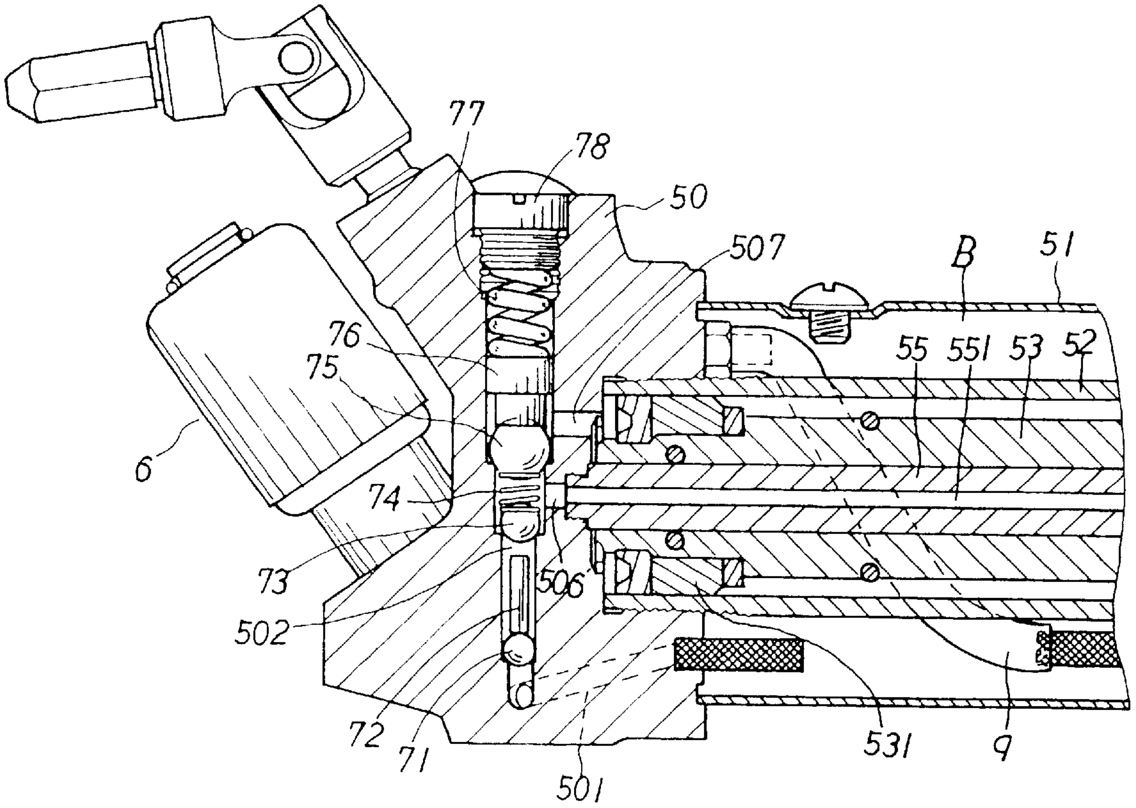
FIG. 8 is a partially cut-away cross-sectional assembly view of the jack assembly that may be lifted rapidly in accordance with the preferred embodiment of the present invention.

The main oil path 502 has an inner wall formed with a first oil hole 506 (see FIG. 8) that is located above the lower ball 73. The first oil hole 506 is connected to an oil hole 551 of a center of a secondary shaft 55 that is mounted in the lifting column 53. The inner wall of the main oil path 502 is formed with a second oil hole 507 (see FIG. 8) that is located above the upper ball 75, and is connected to the inner oil chamber.

Figure 6:
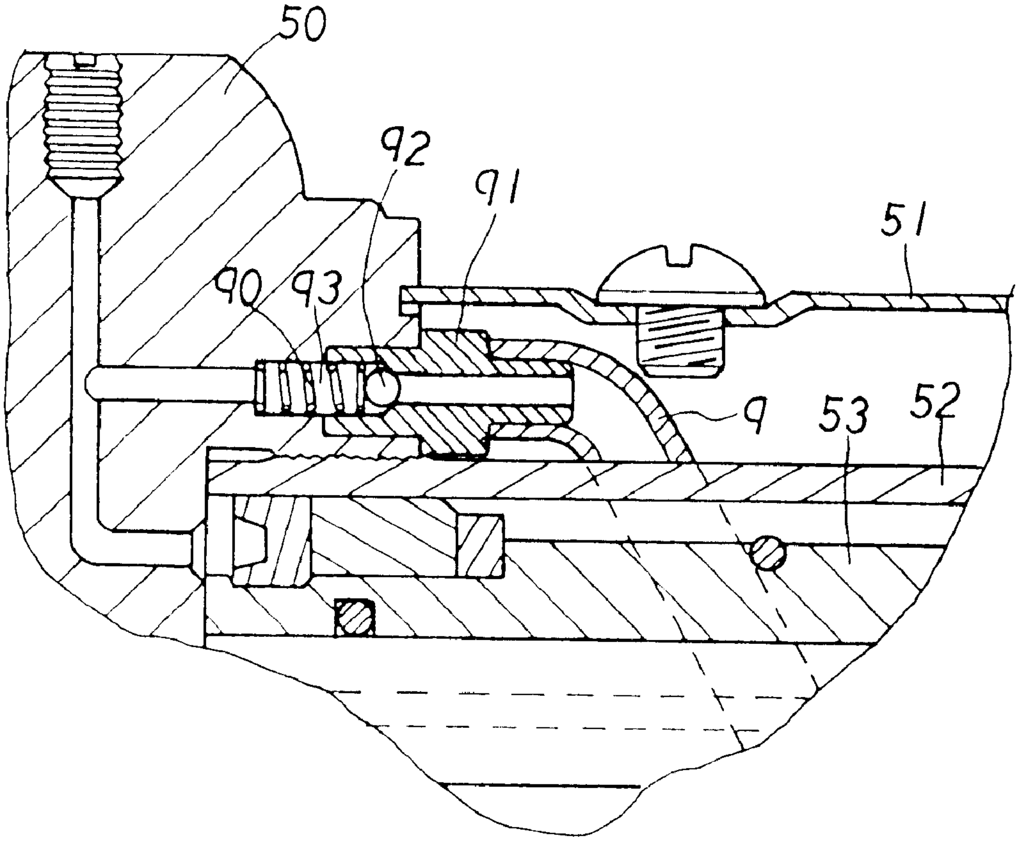
FIG. 6 is a locally cross-sectional view of the jack assembly that may be lifted rapidly in accordance with the preferred embodiment of the present invention.

Referring to FIGS. 5 and 6, the base 50 has another end face provided with an anti-reverse valve which includes a screw seat 91, a ball 92, and a spring 90. The anti-reverse valve is formed with an oil hole 93 having a first end connected to a conducting pipe 9 that is connected to the oil storage chamber "B", and a second end connected to the inner oil chamber of the inner cylinder 52.

Referring to FIG. 7, an oil hole 503 located above the anti-reverse ball 71 is formed in the inner wall of the main oil path 502, and is connected to a return oil path 504. A spring 82 is mounted in the return oil path 504, and is pushed by a screw 81. A pusher 83 is mounted on the lower end of the spring 82, and has a distal end provided with a ball 84 which is placed in an oil hole that is connected to the oil hole 503. The inner wall of the return oil path 504 is formed with a return oil hole 505 that is connected to the oil storage chamber "B".

Thus, the compression action of the pump 6 on the base 50 and the action of the return oil path 504 are substantially similar to that of the conventional jack, and will not be further described in detail.

The difference of operation will be described as follows.

When the hydraulic oil is compressed by the pump 6, the hydraulic oil will push away the lower ball 73, so that the hydraulic oil may flow through the first oil hole 506 into the oil hole 551 of the secondary shaft 55. Thus, due to the smaller cross-sectional area of the axial hole for receiving the secondary shaft 55, the hydraulic oil may push the lifting column 53, so that the lifting column 53 that has not worked yet may be lifted rapidly, thereby shortening the working stroke.

At the same time, during the non-work stroke of the lifting column 53, the suction action applied on the inner oil chamber of the inner cylinder 52 may force the hydraulic oil to flow through the conducting pipe 9, the anti-reverse valve and the oil hole 93 to enter the inner oil chamber of the inner cylinder 52, so that the lifting column 53 may be conveniently lifted rapidly.

When the lifting column 53 is lifted to a determined position to bear support the workpiece, the pressure of the hydraulic oil of the main oil path 502 is increased largely, whereby the upper ball 75 is pushed away, so that the hydraulic oil flows through the second oil hole 507 into the inner oil chamber of the inner cylinder 52. The inner oil chamber of the inner cylinder 52 has a larger cross-sectional area, so that the lifting column 53 may have a sufficient lifting force to lift the workpiece or the object.

At the same time, the anti-reverse valve may prevent the hydraulic oil of a high pressure in the inner oil chamber of the inner cylinder 52 from returning into the oil storage chamber "B".

Although the invention has been explained in relation to its preferred embodiment as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A jack assembly that may be lifted rapidly, comprising: a base, a push seat, and an outer cylinder and an inner cylinder mounted between the base and the push seat, an inner oil chamber formed in the inner cylinder, an oil storage chamber formed between the outer cylinder and the inner cylinder, a lifting column mounted in the inner cylinder, and having a distal end provided with a piston, the base provided with a main oil path, and having an end face provided with an oil suction hole connected to the oil storage chamber and connected to a lower end of the main oil path, an anti-reverse ball mounted in the lower end of the main oil path to block the main oil path, and is pushed by a post, an oil hole located above the anti-reverse ball being formed in the inner wall of the main oil path, and connected to a return oil path; wherein:

a lower ball is mounted in a mediate portion of the main oil path, and is pushed by a first spring, an upper end of the first spring is provided with an upper ball, the upper ball is provided with a push post which is pushed by a second spring, an upper end of the second spring is pushed by an adjusting screw, the main oil path has an inner wall formed with a first oil hole that is located above the lower ball, the first oil hole is connected to an oil hole of a center of a secondary shaft that is mounted in the lifting column, the inner wall of the main oil path is formed with a second oil hole that is located above the upper ball, and is connected to the inner oil chamber; and wherein:

hydraulic oil in the oil storage chamber pushes away the lower ball, so that the hydraulic oil may flow through the first oil hole into the oil hole of the secondary shaft, the hydraulic oil may push the lifting column by means of a smaller cross-sectional area of an axial hole for receiving the secondary shaft, so that the lifting column that has not worked may be lifted rapidly, thereby shortening the working stroke, when lifting of the lifting column is stopped, the lifting column works and a pressure of the hydraulic oil of the main oil path is increased largely, whereby the upper ball is pushed away, so that the hydraulic oil flows through the second oil hole into the inner oil chamber of the inner cylinder, the inner oil chamber of the inner cylinder has a larger cross-sectional area, so that the lifting column may have a sufficient lifting force to lift an object.

2. The jack assembly that may be lifted rapidly in accordance with claim 1, wherein the base has another end face provided with an anti-reverse valve, so that the hydraulic oil in the oil storage chamber may be introduced into the inner oil chamber of the inner cylinder, and hydraulic oil in the inner oil chamber of the inner cylinder cannot flow into the oil storage chamber.

3. The jack assembly that may be lifted rapidly in accordance with claim 2, wherein the anti-reverse valve includes a screw seat, a ball, and a spring.

4. The jack assembly that may be lifted rapidly in accordance with claim 2, wherein the anti-reverse valve has an oil hole formed in the end face of the base, the oil hole has a first end connected to a conducting pipe that is connected to the oil storage chamber, and a second end connected to the inner oil chamber of the inner cylinder.

5. The jack assembly that may be lifted rapidly in accordance with claim 4, wherein during a non-work stroke of the lifting column, a suction action applied on the inner oil chamber of the inner cylinder forces hydraulic oil to flow through the conducting pipe, the anti-reverse valve and the oil hole to enter the inner oil chamber of the inner cylinder, so that the lifting column may be conveniently lifted rapidly.

6. The jack assembly that may be lifted rapidly in accordance with claim 1, further comprising a spring mounted in the return oil path and pushed by a screw, a pusher mounted on a lower end of the spring, and having a distal end provided with a ball which is placed in an oil hole that is connected to the oil hole.

7. The jack assembly that may be lifted rapidly in accordance with claim 6, wherein the return oil path has an inner wall formed with a return oil hole that is connected to the oil storage chamber.

* * * * *